US 9,591,221 B2

(12) United States Patent
Miller et al.

(10) Patent No.: US 9,591,221 B2
(45) Date of Patent: Mar. 7, 2017

(54) MAGNETIC CAMERA COMPONENT MOUNTING IN CAMERAS

(71) Applicant: Apple Inc., Cupertino, CA (US)

(72) Inventors: Scott W. Miller, Los Gatos, CA (US); David C. Beard, Los Gatos, CA (US); Douglas S. Brodie, Los Gatos, CA (US); Aurelien R. Hubert, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/294,100

(22) Filed: Jun. 2, 2014

(65) Prior Publication Data
US 2015/0195439 A1 Jul. 9, 2015

Related U.S. Application Data

(60) Provisional application No. 61/925,201, filed on Jan. 8, 2014.

(51) Int. Cl.
H04N 5/232 (2006.01)
H04N 5/225 (2006.01)
(Continued)

(52) U.S. Cl.
CPC .......... H04N 5/2328 (2013.01); G02B 7/023 (2013.01); G02B 27/646 (2013.01); H04N 5/2253 (2013.01); H04N 5/2257 (2013.01)

(58) Field of Classification Search
CPC .............. G02B 7/08; G03B 2205/0007; G03B 2205/0053; G03B 3/10; H04N 5/23287
See application file for complete search history.

(56) References Cited

U.S. PATENT DOCUMENTS 8,380,057 B2 2/2013 Wu et al.
8,743,203 B2 * 6/2014 Karner ............... B29C 45/0017
340/461
(Continued)

FOREIGN PATENT DOCUMENTS

WO 2013183270 12/2013

OTHER PUBLICATIONS

International Search Report and Written Opinion from PCT/US2014/071185, Dated Mar. 17, 2015, Apple Inc., pp. 1-5.
(Continued)

Primary Examiner — Amy Hsu
(74) Attorney, Agent, or Firm — Robert C. Kowert; Meyertons, Hood, Kivlin, Kowert & Goetzel, P.C.

(57) ABSTRACT

An actuator module for optical image stabilization of a lens assembly relative to an image sensor in a camera includes a coil mounting structure. A plurality of optical image stabilization (OIS) coils is mounted to the coil mounting structure. Some embodiments include a lens assembly structure configured to hold a lens assembly. A plurality of magnets is affixed to the lens assembly structure. Some embodiments include a spring assembly for coupling the coil mounting structure to the lens assembly structure, such that the lens assembly structure is movable relative to the coil mounting structure in a plane orthogonal to an optical axis of the lens assembly. The lens assembly comprises a light input side and an opposing light exit side for providing light for an image to an image sensor. The plurality of OIS coils is mounted closer to the light input side than the plurality of magnets.

20 Claims, 13 Drawing Sheets

(51) Int. Cl.
*G02B 27/64* (2006.01)
*G02B 7/02* (2006.01)

(56) References Cited

U.S. PATENT DOCUMENTS

| | | | |
|---|---|---|---|
| 2008/0231955 A1* | 9/2008 | Otsuka | G02B 27/646 359/557 |
| 2011/0103782 A1* | 5/2011 | Tsuruta | G02B 7/022 396/55 |
| 2012/0105960 A1* | 5/2012 | Park | G02B 27/646 359/554 |
| 2012/0314307 A1* | 12/2012 | Ikushima | G02B 7/08 359/814 |
| 2013/0016428 A1* | 1/2013 | Sugawara | G02B 7/08 359/557 |
| 2013/0278785 A1* | 10/2013 | Nomura | H04N 5/23287 348/208.11 |
| 2014/0009631 A1 | 1/2014 | Topliss | |
| 2014/0333784 A1* | 11/2014 | Hu | G02B 27/646 348/208.2 |
| 2015/0015729 A1* | 1/2015 | Kasamatsu | H04N 5/2257 348/208.11 |

OTHER PUBLICATIONS

International Preliminary Report from International Application No. PCT/US2014/071185, Date of mailing Jul. 21, 2016, Apple Inc., pp. 1-11.

* cited by examiner

MAGNETIC CAMERA COMPONENT MOUNTING IN CAMERAS

CLAIM OF PRIORITY

This application claims benefit of priority of U.S. Provisional Application Ser. No. 61/925,201 entitled "Magnetic Camera Component Mounting in Cameras" filed Jan. 8, 2014, the content of which is incorporated by reference herein in its entirety and for all purposes.

BACKGROUND

Technical Field

This disclosure relates generally to control of the motion of camera components.

Description of the Related Art

For high-end computing devices, it is common to incorporate miniature cameras, with 'optical image stabilization' (OIS) using magnetic coils, whereby the object focal distance is adjusted to allow objects at different distances to be in sharp focus at the image plane, to be captured by the digital image sensor. There have been many proposals for achieving such adjustment of focal position.

Demands on improvements to performance of such miniature cameras are constant, as are demands for continued miniaturization, given the added features and devices added to such mobile devices.

In particular, demands to decrease the dimensions of camera components and demands for high image quality continue to create an ongoing desire for camera components that exhibit superior performance as measured in various ways, while consuming less space.

SUMMARY OF EMBODIMENTS

Some embodiments provide an actuator module for optical image stabilization of a lens assembly relative to an image sensor in a camera. In some embodiments, the actuator module includes a coil mounting structure. A plurality of optical image stabilization (OIS) coils is mounted to the coil mounting structure. Some embodiments include a lens assembly structure configured to hold a lens assembly. A plurality of magnets is affixed to the lens assembly structure. Some embodiments include a spring assembly for coupling the coil mounting structure to the lens assembly structure, such that the lens assembly structure is movable relative to the coil mounting structure in a plane orthogonal to an optical axis of the lens assembly. In some embodiments, the lens assembly comprises a light input side and an opposing light exit side for providing light for an image to an image sensor. The plurality of OIS coils is mounted closer to the light input side than the plurality of magnets.

Figure 1:
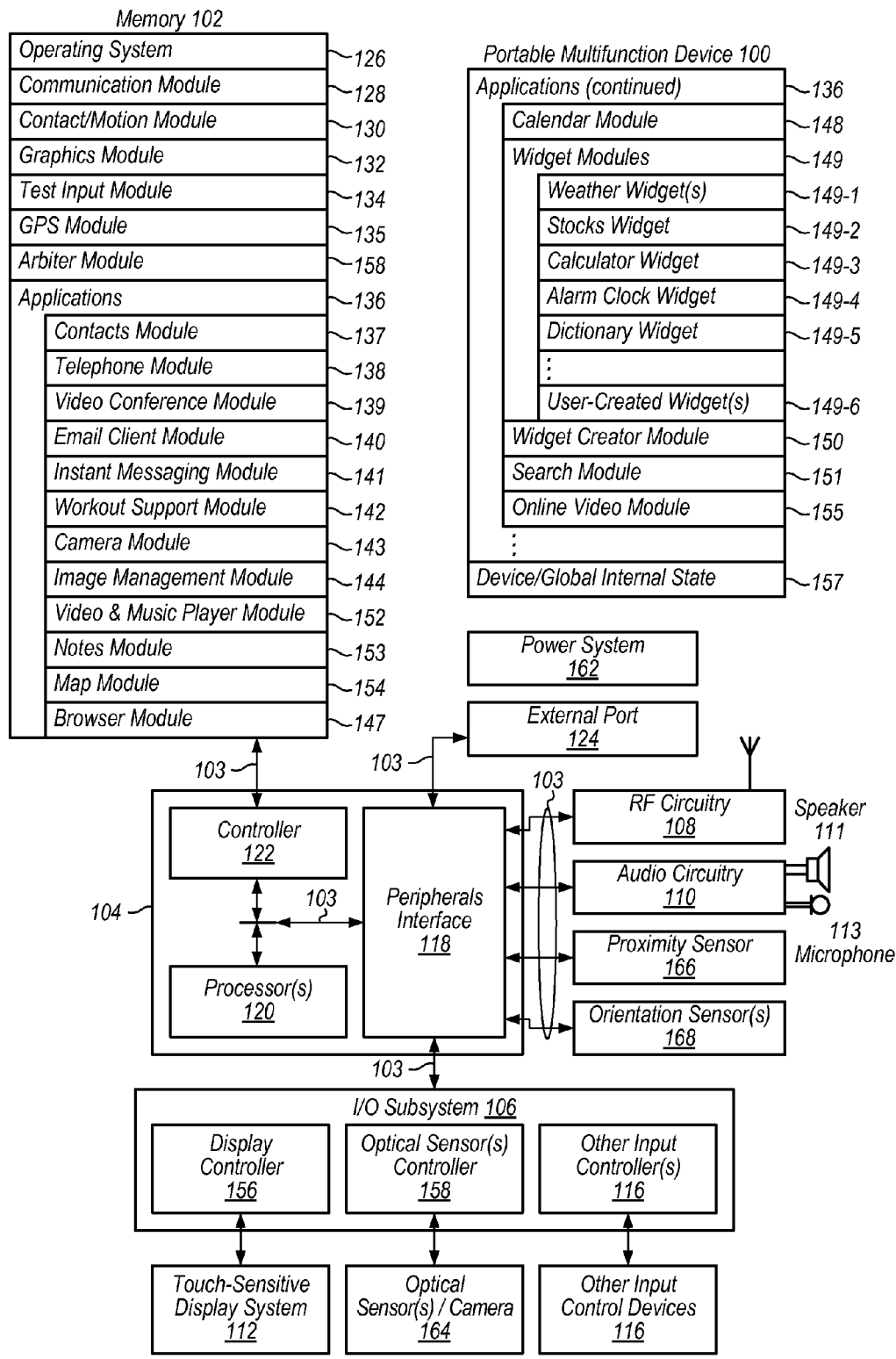
FIG. 1 illustrates a block diagram of a portable multifunction device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments include an actuator module for optical image stabilization of a lens assembly relative to an image sensor in a camera. In some embodiments, the actuator module includes a coil mounting structure. A plurality of optical image stabilization (OIS) coils is mounted to the coil mounting structure. Some embodiments include a lens assembly structure configured to hold a lens assembly. A plurality of magnets is affixed to the lens assembly structure. Some embodiments include a spring assembly for coupling the coil mounting structure to the lens assembly structure, such that the lens assembly structure is movable relative to the coil mounting structure in a plane orthogonal to an optical axis of the lens assembly. In some embodiments, the lens assembly comprises a light input side and an opposing light exit side for providing light for an image to an image sensor. The plurality of OIS coils are mounted closer to the light input side than the plurality of magnets.

In some embodiments, the coil mounting structure includes a module cover. A top side of the module cover includes an opening for the light input side of the lens assembly. The plurality of optical image stabilization coils are mounted between the top side of the module cover and the plurality of magnets. In some embodiments, the module cover comprises a module cover of a material having a magnetic composition.

In some embodiments, the module cover comprises a module cover of a material having a ferrous coating. In some embodiments, the module cover comprises a module cover of a material having a magnetic coating. Some embodiments include a plurality Hall sensors affixed to the coil mounting structure, wherein the Hall sensors are configured for sensing positional information of the lens assembly.

In some embodiments, the coil mounting structure further includes a base portion holding the Hall sensors, and a coil holding plate elevated above the base portion on one columns, wherein the OIS coils are affixed to the coil holding plate. The plurality of magnets are affixed to the lens assembly structure between the base portion and the coil holding plate of the coil mounting structure.

Some embodiments provide an apparatus for controlling the motion of a camera component. In some embodiments, the apparatus includes an actuator module for controlling the position of a lens relative to an image sensor in a miniature camera. The actuator module includes an actuator module support structure. The actuator module further includes a focusing mechanism suspended on the actuator module support structure by a suspension means configured to limit relative motion of a lens carrier mounted to the focusing mechanism. Some embodiments further include a plurality of magnets affixed beneath the module cover at positions in a plane orthogonal to an optical axis of a lens mounted in the lens carrier, and a plurality of optical image stabilization coils mounted between the module cover and the plurality of magnets.

In some embodiments the plurality of optical image stabilization coils mounted between the module cover and the plurality of magnets further comprises a plurality of optical image stabilization coils mounted between a magnetic yoke and the plurality of magnets. In some embodiments the module cover includes a module cover of a material having a ferrous composition. In some embodiments the module cover includes a module cover of a material having a magnetic composition. In some embodiments the module cover includes a module cover a module cover of a material having a ferrous coating. In some embodiments the module cover includes a module cover a module cover of a material having a magnetic coating. In some embodiments, the actuator module support structure comprises the module cover.

Some embodiments include a camera module. In some embodiments, the camera module includes a focusing mechanism suspended on an actuator module support structure by a suspension means configured to limit relative motion of a lens carrier mounted to the focusing mechanism. In some embodiments, the camera module further includes a plurality of magnets affixed beneath a module cover and a plurality of hall sensors mounted to the actuator module support structure. In some embodiments, the camera module further includes a plurality of optical image stabilization coils mounted to the actuator module support structure, wherein the optical image stabilization coils are mounted in a direction opposite the hall sensors with respect to the plurality of magnets.

In some embodiments the plurality of optical image stabilization coils mounted between the module cover and the plurality of magnets further comprises a plurality of optical image stabilization coils mounted between a magnetic yoke and the plurality of magnets. In some embodiments the module cover includes a module cover of a material having a ferrous composition. In some embodiments the module cover includes a module cover of a material having a magnetic composition. In some embodiments the module cover includes a module cover a module cover of a material having a ferrous coating. In some embodiments the module cover includes a module cover a module cover of a material having a magnetic coating. In some embodiments, the actuator module support structure comprises the module cover.

Some embodiments include a multifunction device having a camera module. In some embodiments, the camera module includes an actuator module support structure, and a module cover. In some embodiments, the camera module includes a focusing mechanism for moving a lens relative to an image sensor. The focusing mechanism is suspended on the actuator module support structure by a suspension means configured to limit relative motion of the lens carrier mounted. In some embodiments, the camera module includes a plurality of magnets affixed beneath the module cover. In some embodiments, the camera module includes a plurality of optical image stabilization coils mounted to the actuator module support structure, wherein the optical image stabilization coils are mounted in a direction opposite the image sensor with respect to the plurality of magnets.

In some embodiments the plurality of optical image stabilization coils mounted between the module cover and the plurality of magnets further comprises a plurality of optical image stabilization coils mounted between a magnetic yoke and the plurality of magnets. In some embodiments the module cover includes a module cover of a material having a ferrous composition. In some embodiments the module cover includes a module cover of a material having a magnetic composition. In some embodiments the module cover includes a module cover a module cover of a material having a ferrous coating. In some embodiments the module cover includes a module cover a module cover of a material having a magnetic coating. In some embodiments, the actuator module support structure comprises the module cover.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 1A is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
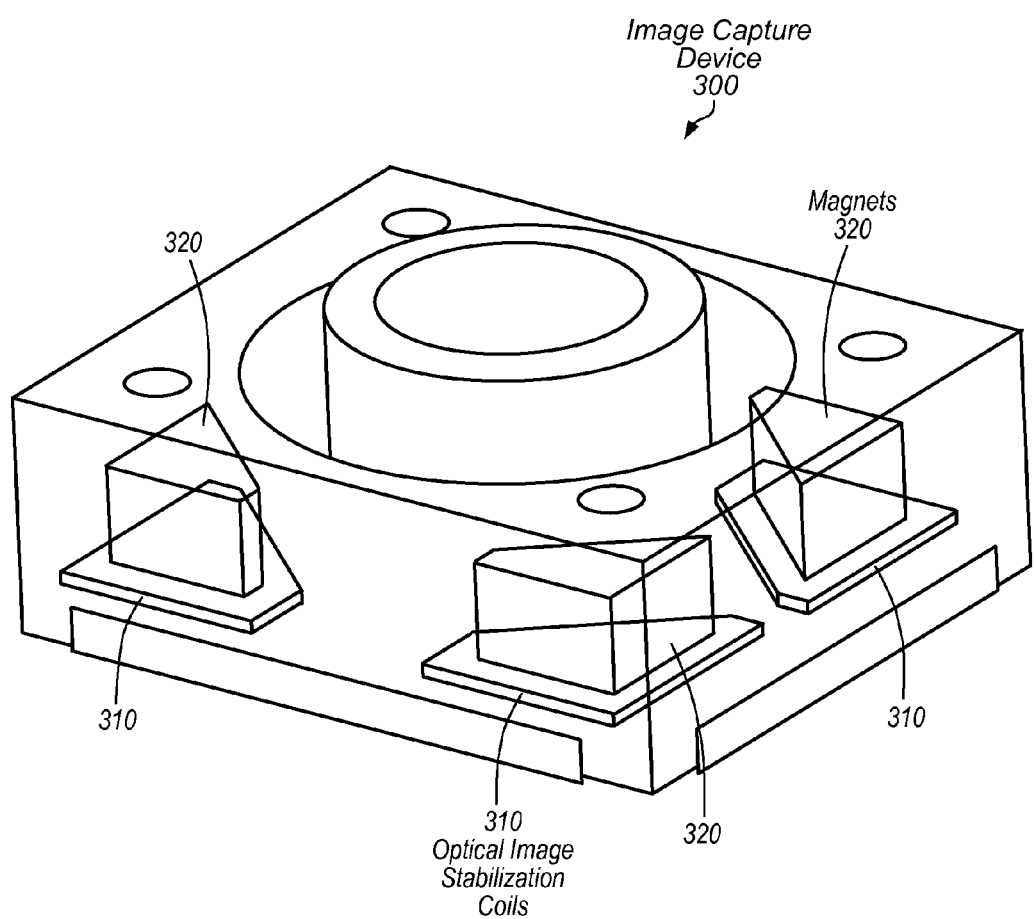
FIG. 3 illustrates a camera module.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
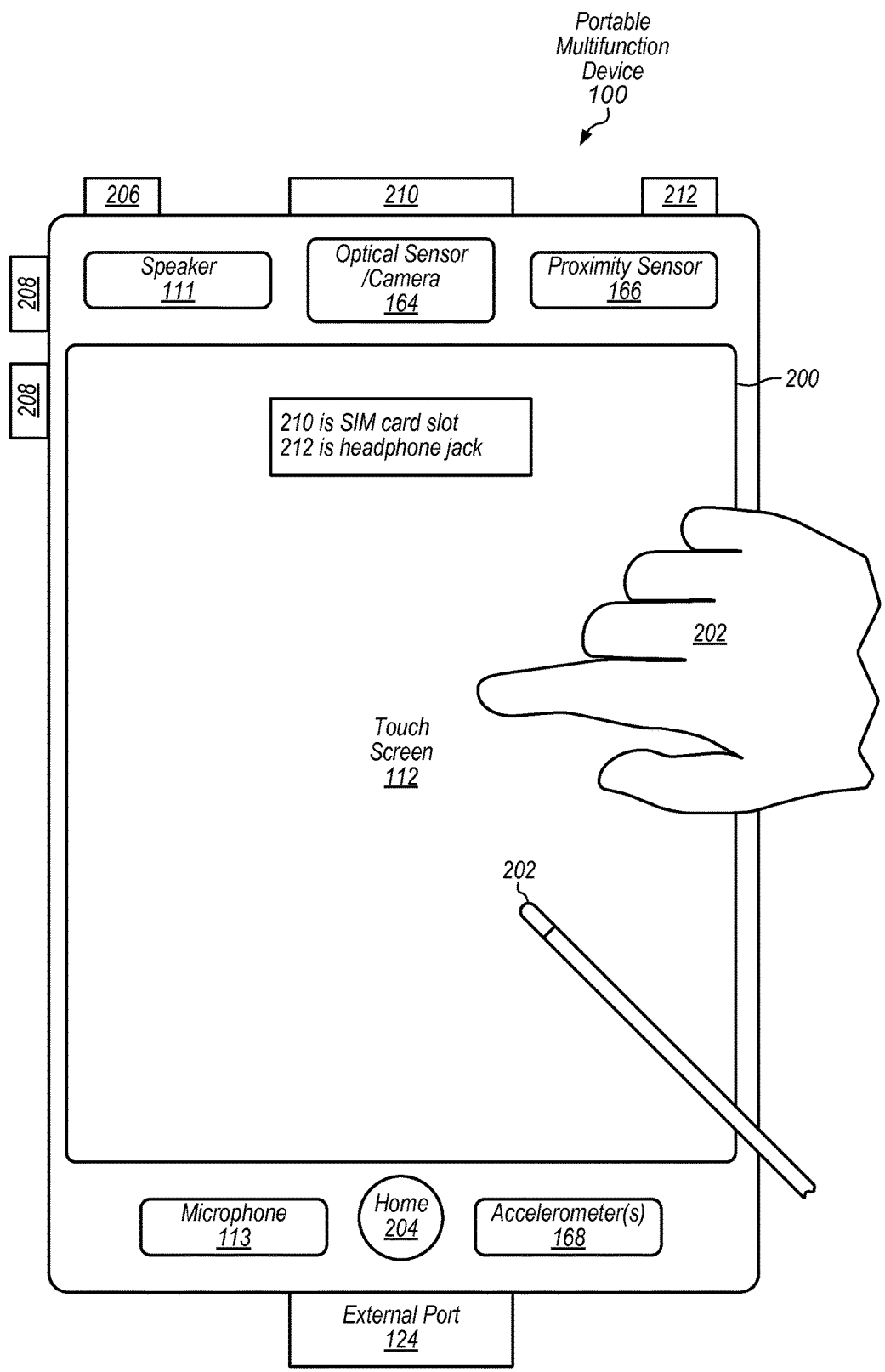
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 (on the front of a device), rear-facing camera or optical sensor that is pointed opposite from the display may be used instead of optical sensor/camera 164.

Camera Module of a Multifunction Device and Placement of Optical Image Stabilization (OIS) Coils FIG. 3 illustrates a camera module. A camera (image capture device) 300 is shown. Optical image stabilization coils 310 are mounted adjacent to Hall sensors (not visible) on an "underside," (i.e., between the sensors and) magnets 320.

Figure 4A:
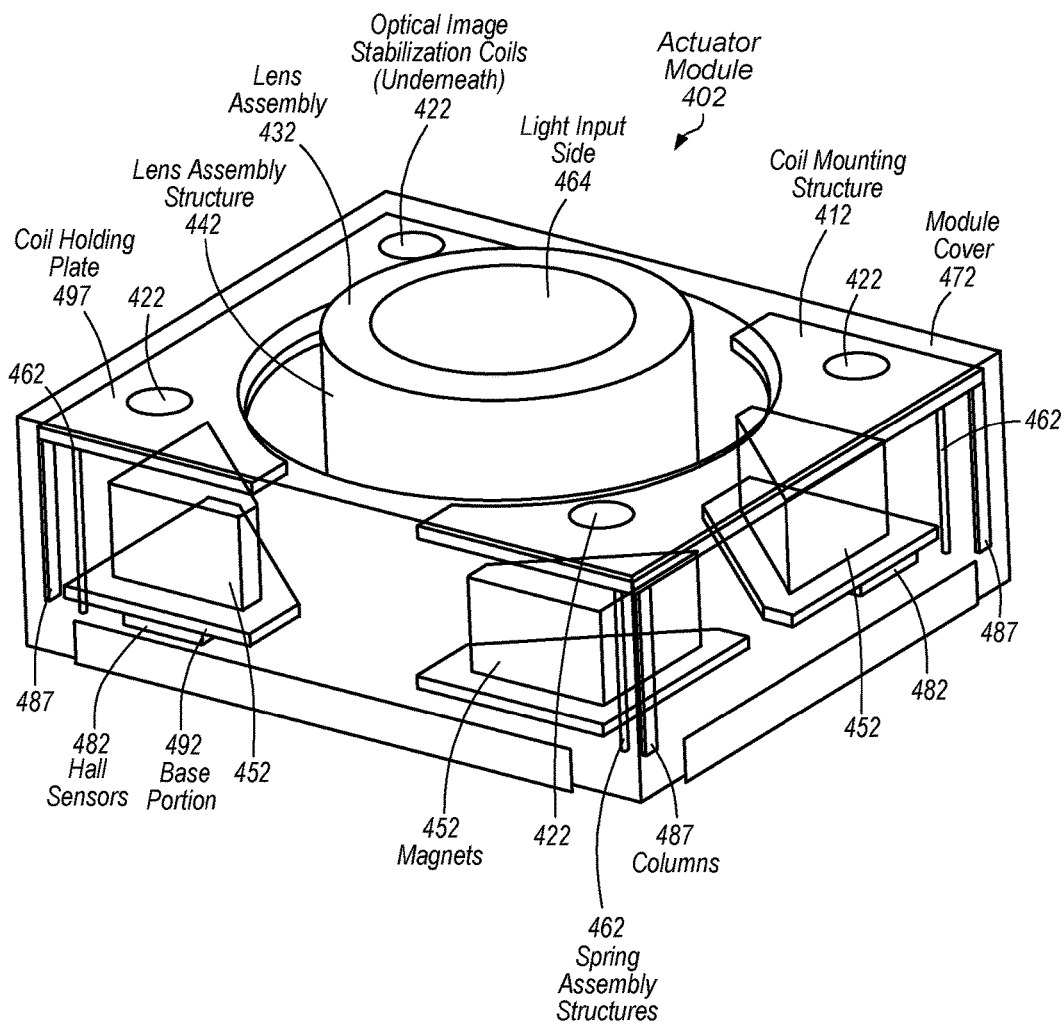
FIG. 4A depicts a camera module, according to some embodiments.

FIG. 4A depicts a camera module, according to some embodiments. An actuator module 402 for optical image stabilization of a lens assembly relative to an image sensor in a camera is depicted. Actuator module 402 includes a coil mounting structure 412. A plurality of optical image stabilization (OIS) coils 422 is mounted to the coil mounting structure 412.

A lens assembly structure 442 is configured to hold a lens assembly 432. A plurality of magnets 452 is affixed to the lens assembly structure. A spring assembly 462 is included for coupling the coil mounting structure 412 to the lens assembly structure 442, such that the lens assembly structure 442 is movable relative to the coil mounting structure 412 in a plane orthogonal to an optical axis of the lens assembly 432.

The lens assembly 432 includes a light input side 464 and an opposing light exit side (not visible) for providing light for an image to an image sensor (not visible). The plurality of OIS coils 422 are mounted closer to the light input side 464 than the plurality of magnets 452.

The coil mounting structure 412 includes or is attached to a module cover 472. A top side of the module cover 472 includes an opening for the light input side 464 of the lens assembly 432. The plurality of optical image stabilization coils 422 is mounted between the top side of the module cover 472 and the plurality of magnets 452. In some embodiments module cover 472 is made of a material having a magnetic composition. In some embodiments module cover 472 is made of a material having a ferrous coating. In some embodiments module cover 472 is made of a material having a magnetic coating.

Some embodiments include a plurality of Hall sensors 482 affixed to the coil mounting structure 412. The Hall sensors 482 are configured for sensing positional information of the lens assembly 432. In some embodiments, the coil mounting structure 412 includes a base portion 492 holding the Hall sensors 482, and a coil holding plate 497 elevated above the base portion 492 on one or more columns 487. The OIS coils 422 are affixed to the coil holding plate 497. The plurality of magnets 452 is affixed to the lens assembly structure 442 between the base portion 492 and the coil holding plate 497 of the coil mounting structure 412.

Figure 4B:
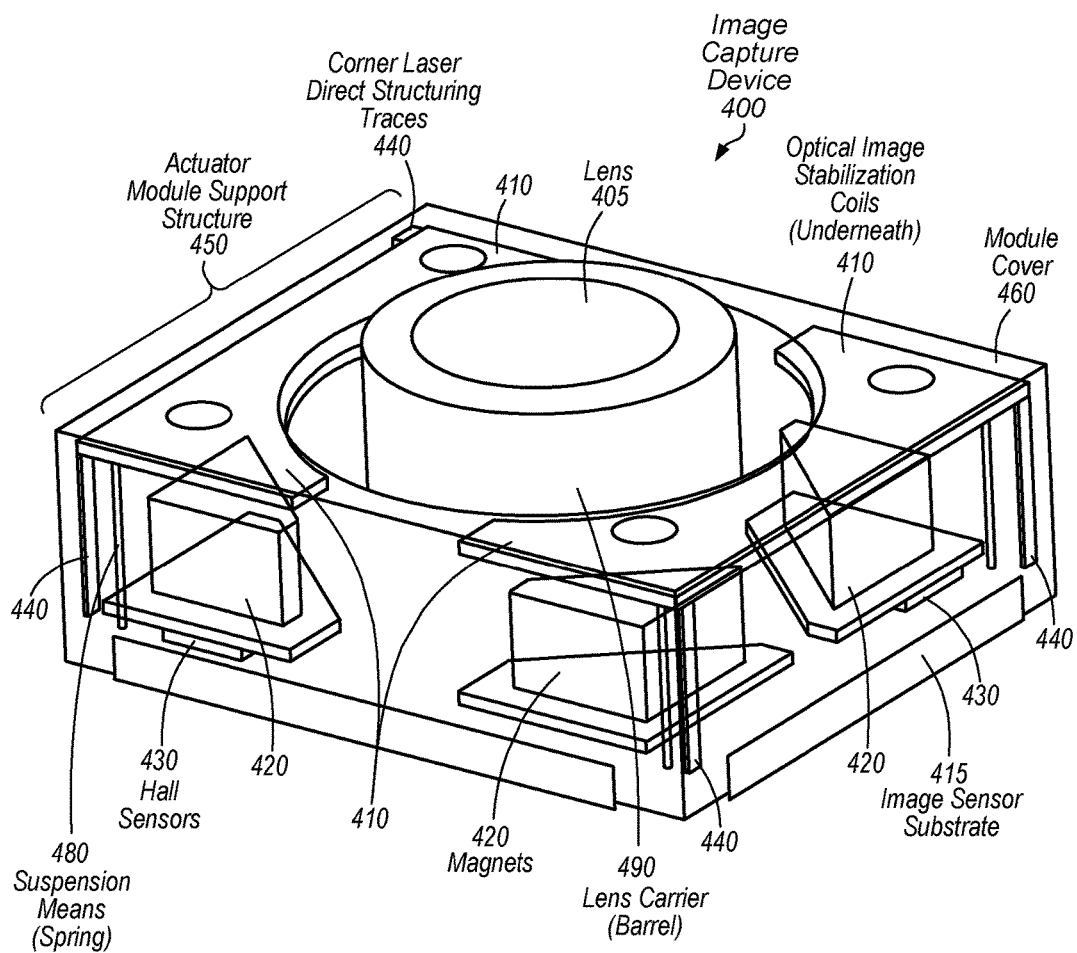
FIG. 4B illustrates a camera module with optical image stabilization coils moved to a position opposite the image sensor, according to some embodiments.

FIG. 4B illustrates a camera module with optical image stabilization coils moved to a position opposite the image sensor, according to some embodiments. A camera 400 is shown. Optical image stabilization coils 410 are mounted opposite to Hall sensors 430 on top of (i.e., opposite the sensors with respect to) magnets 420. Corner laser direct structuring traces 440 conduct electrical power to optical image stabilization coils 410.

In some embodiments, an actuator module support structure 450 includes a module cover 460. A focusing mechanism is suspended on the actuator module support structure 450 by a suspension means 480 configured to limit relative motion of a lens carrier (barrel 490) mounted to the focusing mechanism. A plurality of magnets 420 affixed beneath the module cover 460 at positions in a plane orthogonal to an optical axis of a lens 405 mounted in the lens carrier 490. A plurality of optical image stabilization coils 410 is mounted between the cover 460 and the plurality of magnets 420.

In some embodiments, a focusing mechanism is suspended on an actuator module support structure 450 by a suspension means 480 configured to limit relative motion of a lens carrier 490 mounted to the focusing mechanism. A plurality of magnets 420 is affixed beneath the module cover 460. A plurality of hall sensors 430 is mounted to the actuator module support structure 450. A plurality of optical image stabilization coils 410 is mounted to the actuator module support structure 450. The optical image stabilization coils 410 are mounted in a direction opposite the hall sensors 430 with respect to the plurality of magnets 420.

In some embodiments, a camera module (image capture device) 400) includes an actuator module support structure 450. In some embodiments, the actuator module support structure 450 includes a module cover 460. A focusing mechanism moves a lens 405 relative to an image sensor (not shown, carried on image sensor substrate 415). The focusing mechanism is suspended on the actuator module support structure 450 by a suspension means 480 configured to limit relative motion of a lens carrier 490 carrying the lens 405. A plurality of magnets 420 is affixed beneath the module cover 460. A plurality of optical image stabilization coils 410 is mounted to the actuator module support structure 450. The optical image stabilization coils 410 are mounted in a direction opposite the image sensor (not shown) with respect to the plurality of magnets 420.

Figure 5:
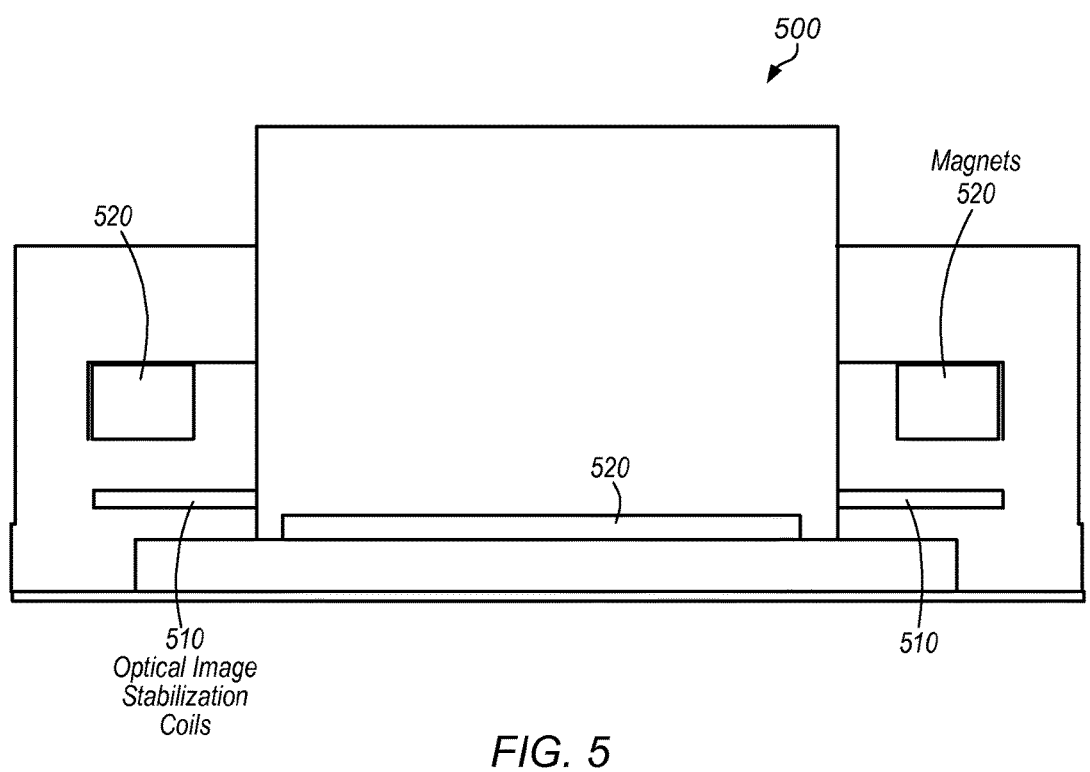
FIG. 5 depicts a cutaway view a camera module.

FIG. 5 depicts a cutaway view a camera module of design. A camera (image capture device) 500 is shown. Optical image stabilization coils 510 are mounted adjacent to Hall sensors (not visible) on an "underside," (i.e., between the sensors and) magnets 520.

Figure 6:
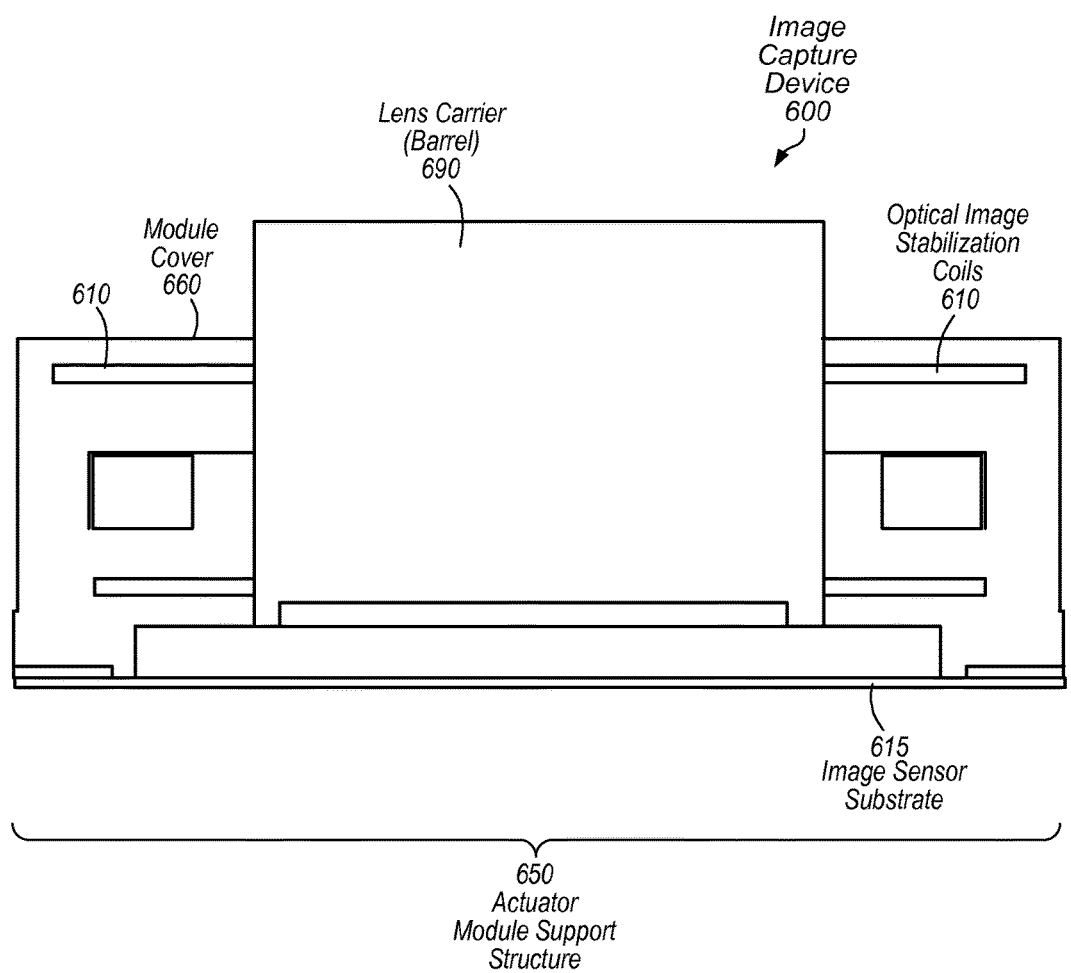
FIG. 6 illustrates a cutaway view of a camera module with optical image stabilization coils moved to a position opposite the image sensor, according to some embodiments.

FIG. 6 illustrates a cutaway view of a camera module with optical image stabilization coils moved to a position opposite the image sensor, according to some embodiments. A camera 600 is shown. Optical image stabilization coils 610 are mounted opposite to Hall sensors (not shown) on top of (i.e., opposite the sensors with respect to) magnets 620.

In some embodiments, an actuator module support structure 650 includes a module cover 660. A focusing mechanism is suspended on the actuator module support structure 650 by a suspension means 680 configured to limit relative motion of a lens carrier (barrel 690) mounted to the focusing mechanism. A plurality of magnets 620 affixed beneath the module cover 660 at positions in a plane orthogonal to an optical axis of a lens (not shown) mounted in the lens carrier 690. A plurality of optical image stabilization coils 610 is mounted between the cover 660 and the plurality of magnets 620.

In some embodiments, a focusing mechanism is suspended on an actuator module support structure 650 by a suspension means 680 configured to limit relative motion of a lens carrier 690 mounted to the focusing mechanism. A plurality of magnets 620 is affixed beneath the module cover 660. A plurality of hall sensors (not visible) is mounted to the actuator module support structure 650. A plurality of optical image stabilization coils 610 is mounted to the actuator module support structure 650. The optical image stabilization coils 610 are mounted in a direction opposite the hall sensors 630 with respect to the plurality of magnets 620.

In some embodiments, a camera module (image capture device 600) includes an actuator module support structure 650. In some embodiments, the actuator module support structure 650 includes a module cover 660. A focusing mechanism moves a lens (not visible) relative to an image sensor (not shown, carried on image sensor substrate 615). The focusing mechanism is suspended on the actuator module support structure 650 by a suspension means 680 configured to limit relative motion of a lens carrier 690 carrying the lens. A plurality of magnets 620 is affixed beneath the module cover 660. A plurality of optical image stabilization coils 610 is mounted to the actuator module support structure 650. The optical image stabilization coils 610 are mounted in a direction opposite the image sensor (not shown) with respect to the plurality of magnets 620.

Figure 7:
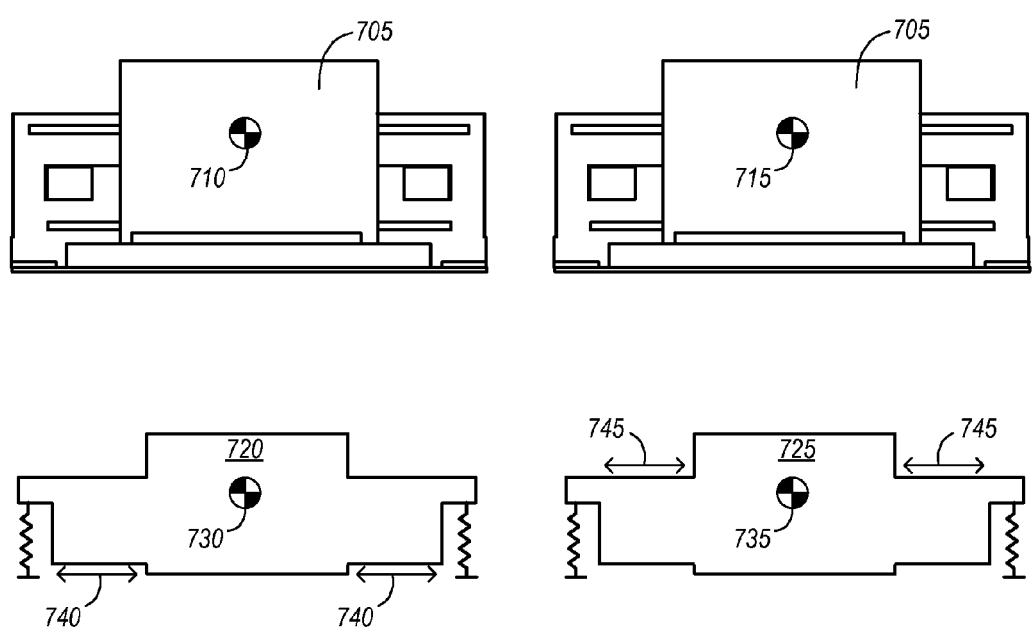
FIG. 7 depicts locations of forces and a center of mass in a camera module with optical image stabilization coils moved to a position opposite the image sensor, according to some embodiments, as compared to a design.

FIG. 7 depicts locations of forces and a center of mass in a camera module with optical image stabilization coils moved to a position opposite the image sensor, according to some embodiments, as compared to a design. A design 700 is shown next to an embodiment 705. design 700 has a center of mass 710, and embodiment 705 has a center of mass 715. A force diagram for design 720 is shown next to a force diagram for an embodiment 725. Force diagram for design 720 is shown with a center of mass 730 and force diagram for an embodiment 725 is shown with a center of mass 735. Force diagram for design 720 is shown with optical image stabilization coil forces 740 and force diagram for an embodiment 725 is shown with optical image stabilization coil forces 745. As can be seen, a distance between center of mass 730 and optical image stabilization coil forces 740 is greater than a distance between center of mass 735 and optical image stabilization coil forces 745.

Figure 8:
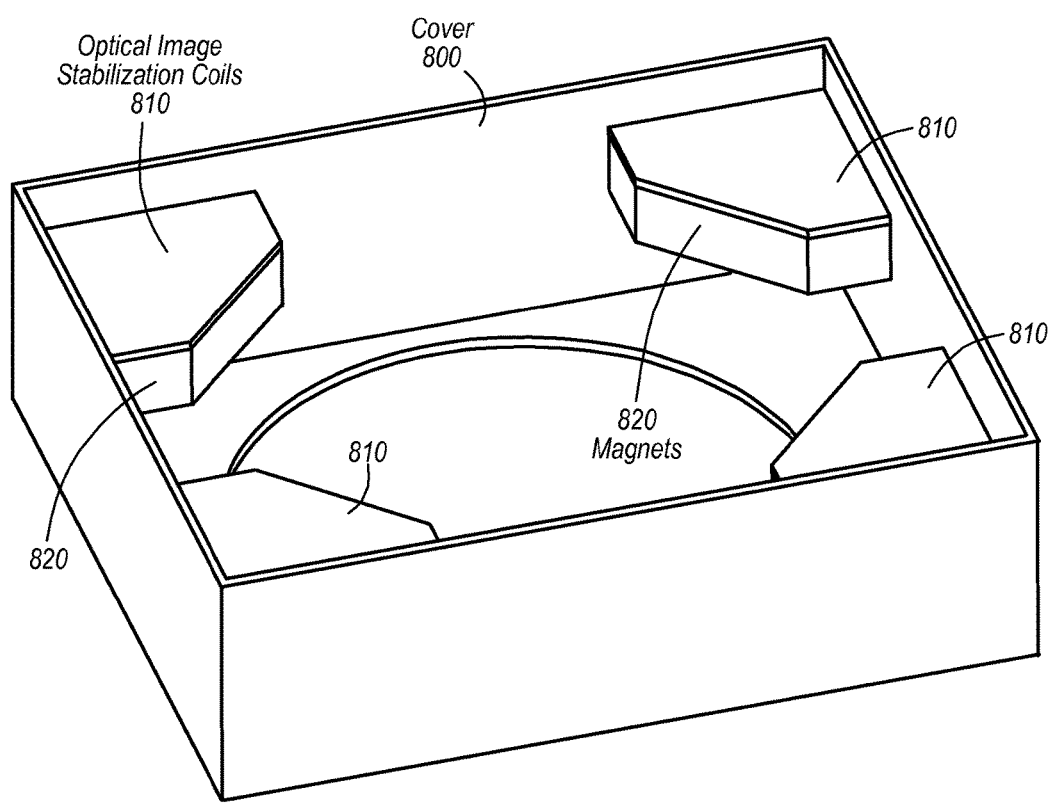
FIG. 8 illustrates an embodiment of a module cover of a camera module of design, according to some embodiments.

FIG. 8 illustrates an embodiment of a module cover of a camera module of design, according to some embodiments. Cover 800 is shown with optical image stabilization coils 810 underneath magnets 820.

Figure 9:
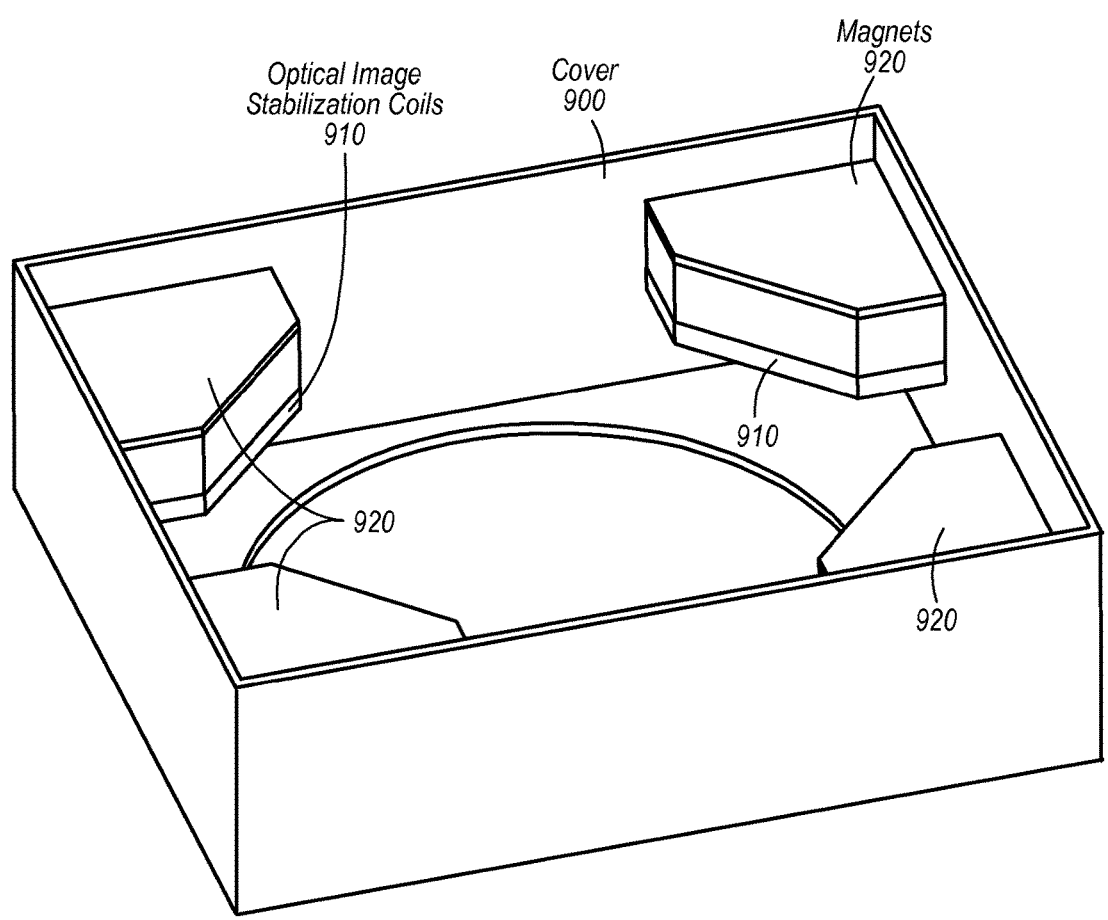
FIG. 9 depicts an embodiment of a module cover of a camera module with optical image stabilization coils moved to a position opposite the image sensor, according to some embodiments.

FIG. 9 depicts an embodiment of a module cover of a camera module with optical image stabilization coils moved to a position opposite the image sensor, according to some embodiments. Cover 900 is shown with optical image stabilization coils 910 underneath magnets 920.

Figure 10:
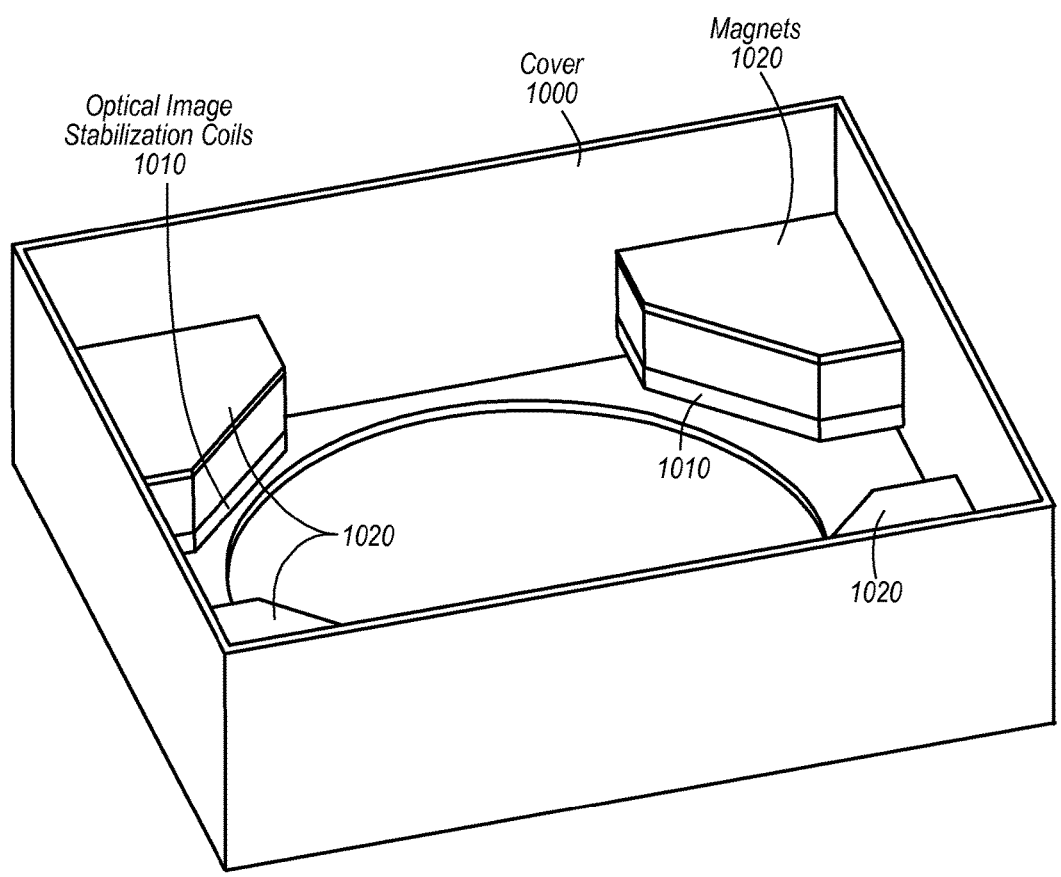
FIG. 10 depicts an embodiment of a module cover of a camera module with optical image stabilization coils moved to a position opposite the image sensor, according to some embodiments.

FIG. 10 depicts an embodiment of a module cover of a camera module with optical image stabilization coils moved to a position opposite the image sensor, according to some embodiments. Cover 1000 is shown with optical image stabilization coils 1010 underneath magnets 1020. In some embodiments, cover 1010 is made of a magnetic or ferrous material.

Figure 11:
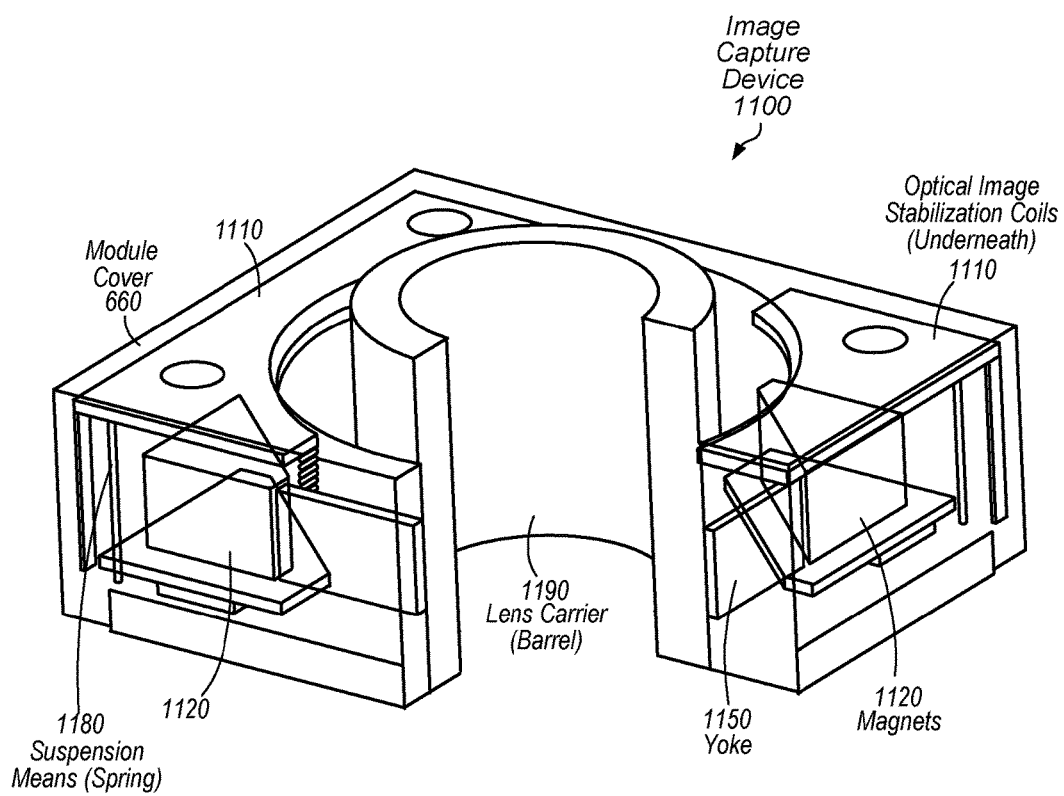
FIG. 11 illustrates an actuator in elevation view, showing a cross-section across the middle, according to some embodiments.

FIG. 11 illustrates an actuator in elevation view, showing a cross-section across the middle, according to some embodiments. FIG. 11 illustrates a cutaway view of a camera module with optical image stabilization coils moved to a position opposite the image sensor, according to some embodiments. A camera 1100 is shown. Optical image stabilization coils 1110 are mounted opposite to Hall sensors (not shown) on top of (i.e., opposite the sensors with respect to) magnets 1120.

In some embodiments, an actuator module support structure 1150 includes a module cover 1160. A focusing mechanism is suspended on the actuator module support structure 1150 by a suspension means 1180 configured to limit relative motion of a lens carrier (barrel 1190) mounted to the focusing mechanism. A plurality of magnets 1120 affixed beneath the module cover 1160 at positions in a plane orthogonal to an optical axis of a lens (not shown) mounted in the lens carrier 1190. A plurality of optical image stabilization coils 1110 is mounted between the cover 1160 and the plurality of magnets 1120.

In some embodiments, a focusing mechanism is suspended on an actuator module support structure 1150 by a suspension means 1180 configured to limit relative motion of a lens carrier 1190 mounted to the focusing mechanism. A plurality of magnets 1120 is affixed beneath the module cover 1160. A plurality of hall sensors (not visible) is mounted to the actuator module support structure 1150. A plurality of optical image stabilization coils 1110 is mounted to the actuator module support structure 1150. The optical image stabilization coils 1110 are mounted in a direction opposite the hall sensors 1130 with respect to the plurality of magnets 1120.

In some embodiments, a camera module (image capture device 1100) includes an actuator module support structure 1150. In some embodiments, the actuator module support structure 1150 includes a module cover 1160. A focusing mechanism moves a lens (not visible) relative to an image sensor (not shown, carried on image sensor substrate 1115). The focusing mechanism is suspended on the actuator module support structure 1150 by a suspension means 1180 configured to limit relative motion of a lens carrier 1190 carrying the lens. A plurality of magnets 1120 is affixed beneath the module cover 11110. A plurality of optical image stabilization coils 1110 is mounted to the actuator module support structure 1150. The optical image stabilization coils 1110 are mounted in a direction opposite the image sensor (not shown) with respect to the plurality of magnets 1120.

Example Computer System

Figure 12:
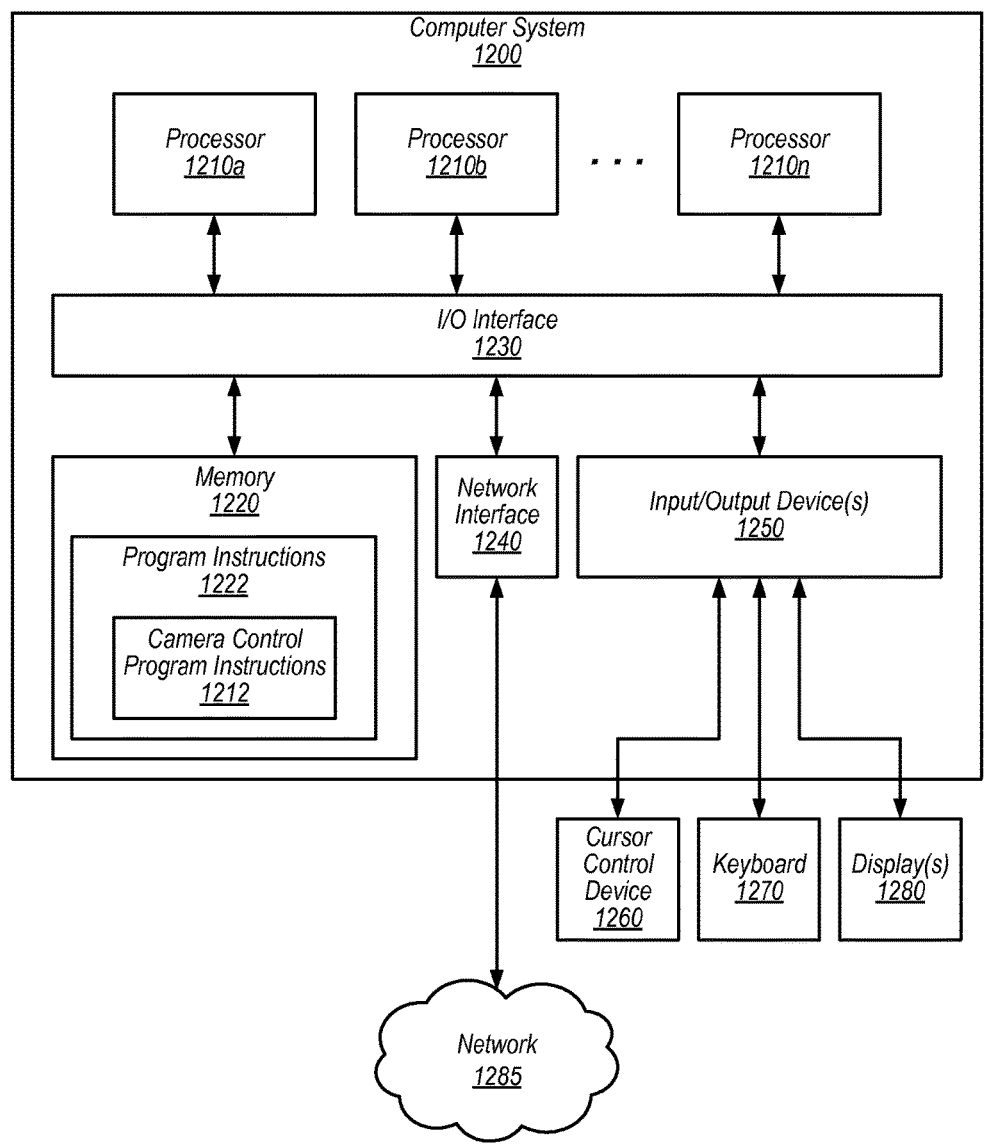
FIG. 12 depicts an example computer system configured to implement aspects of the system and method for camera control, according to some embodiments.

FIG. 12 illustrates computer system 1200 that is configured to execute any or all of the embodiments described above. In different embodiments, computer system 1200 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 1200, which may interact with various other devices. Note that any component, action, or functionality described above with respect to FIGS. 1-20 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x812, PowerPC, SPARC, or MIPS ISAs, or any other suitable ISA. In multiprocessor systems, each of processors 1210 may commonly, but not necessarily, implement the same ISA.

System memory 1220 may be configured to store camera control program instructions 1222 and/or camera control data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a lens control application 1224 incorporating any of the functionality described above. Additionally, existing camera control data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An actuator module for optical image stabilization of a lens assembly relative to an image sensor in a camera, comprising:
   a coil mounting structure, wherein a plurality of optical image stabilization (OIS) coils is mounted to the coil mounting structure;
   a lens assembly structure configured to hold a lens assembly, wherein a plurality of magnets is affixed to the lens assembly structure;
   a plurality of Hall sensors mounted to the coil mounting structure in a direction opposite the OIS coils with respect to the plurality of magnets;
   a spring assembly for coupling the coil mounting structure to the lens assembly structure, such that the lens assembly structure is suspended on the coil mounting structure by the spring assembly and movable relative to the coil mounting structure in a plane orthogonal to an optical axis of the lens assembly;
   wherein the lens assembly comprises a light input side and an opposing light exit side for providing light for an image to an image sensor; and
   wherein the plurality of OIS coils are mounted closer to the light input side than the plurality of magnets.

2. The actuator module of claim 1, wherein the coil mounting structure comprises a module cover, wherein a top side of the module cover includes an opening for the light input side of the lens assembly; wherein the plurality of optical image stabilization coils are mounted between the top side of the module cover and the plurality of magnets.

3. The actuator module of claim 2, wherein the module cover comprises a module cover of a material having a magnetic composition.

4. The actuator module of claim 2, wherein the module cover comprises a module cover of a material having a ferrous coating.

5. The actuator module of claim 2, wherein the module cover comprises a module cover of a material having a magnetic coating.

6. The actuator module of claim 1, wherein the Hall sensors are configured for sensing positional information of the lens assembly.

7. The actuator module of claim 6, wherein the coil mounting structure further comprises:
   a base portion holding the Hall sensors, and
   a coil holding plate elevated above the base portion on one columns, wherein the OIS coils are affixed to the coil holding plate,
   wherein the plurality of magnets are affixed to the lens assembly structure between the base portion and the coil holding plate of the coil mounting structure.

8. A camera module, comprising:
   a lens carrier suspended on an actuator module support structure by a spring assembly configured to limit relative motion of the lens carrier in a plane orthogonal to an optical axis of a lens mounted to the lens carrier;
   a plurality of magnets affixed beneath a module cover;
   a plurality of hall sensors mounted to the actuator module support structure; and
   a plurality of optical image stabilization coils mounted to the actuator module support structure, wherein the optical image stabilization coils are mounted in a direction opposite the hall sensors with respect to the plurality of magnets.

9. The camera module of claim 8, wherein the plurality of optical image stabilization coils mounted between the module cover and the plurality of magnets further comprises a plurality of optical image stabilization coils mounted between a magnetic yoke and the plurality of magnets.

10. The camera module of claim 8, wherein the module cover comprises a module cover of a material having a ferrous composition.

11. The camera module of claim 8, wherein the module cover comprises a module cover of a material having a magnetic composition.

12. The camera module of claim 8, wherein the module cover comprises a module cover of a material having a ferrous coating.

13. The camera module of claim 8, wherein the module cover comprises a module cover of a material having a magnetic coating.

14. The camera module of claim 8, wherein the actuator module support structure comprises the module cover.

15. A multifunction device having a camera module, comprising:
   an actuator module support structure, wherein the actuator module support structure comprises a module cover;
   a lens carrier for moving a lens relative to an image sensor, wherein the lens carrier is suspended on the actuator module support structure by a spring assembly configured to limit relative motion of the lens carrier in a plane orthogonal to an optical axis of the lens carrier;
   a plurality of magnets affixed beneath the module cover;
   a plurality of hall sensors mounted to the actuator module support structure; and a plurality of optical image stabilization coils mounted to the actuator module support structure, wherein the optical image stabilization coils are mounted in a direction opposite the hall sensors with respect to the plurality of magnets.

16. The multifunction device of claim 15, wherein the plurality of optical image stabilization coils mounted between the module cover and the plurality of magnets further comprises a plurality of optical image stabilization coils mounted between a magnetic yoke and the plurality of magnets.

17. The multifunction device of claim 15, wherein the module cover comprises a module cover of a material having a ferrous composition.

18. The multifunction device of claim 15, wherein the module cover comprises a module cover of a material having a magnetic composition.

19. The multifunction device of claim 15, wherein the module cover comprises a module cover of a material having a ferrous coating.

20. The multifunction device of claim 15, wherein the module cover comprises a module cover of a material having a magnetic coating.

\* \* \* \* \*